United States Patent
Bartsch et al.

(10) Patent No.: US 11,297,146 B2
(45) Date of Patent: Apr. 5, 2022

(54) METHOD FOR DATA TRANSMISSION IN A TRANSPORTATION VEHICLE COMMUNICATION NETWORK, TRANSPORTATION VEHICLE COMMUNICATION NETWORK, SUBSCRIBER AND TRANSPORTATION VEHICLE

(71) Applicants: VOLKSWAGEN AG, Wolfsburg (DE); AUDI AG, Ingolstadt (DE)

(72) Inventors: Patrick Bartsch, Wolfsburg (DE); Patrick Lünnemann, Berlin (DE)

(73) Assignees: Volkswagen AG; Audi AG

( * ) Notice: Subject to any disclaimer, the term of this patent is extended or adjusted under 35 U.S.C. 154(b) by 0 days.

(21) Appl. No.: 15/996,269

(22) Filed: Jun. 1, 2018

(65) Prior Publication Data

US 2018/0352040 A1 Dec. 6, 2018

(30) Foreign Application Priority Data

Jun. 1, 2017 (DE) ...................... 10 2017 209 327.7

(51) Int. Cl.
*H04L 67/51* (2022.01)
*H04L 67/12* (2022.01)
(Continued)

(52) U.S. Cl.
CPC .............. *H04L 67/16* (2013.01); *H04L 67/12* (2013.01); *H04L 67/26* (2013.01); *H04L 67/2828* (2013.01); *H04L 67/327* (2013.01)

(58) Field of Classification Search
CPC ..... H04L 67/16; H04L 67/12; H04L 67/2828; H04L 67/00; H04L 67/32; H04L 67/10; H04L 67/26
See application file for complete search history.

(56) References Cited

U.S. PATENT DOCUMENTS 9,338,235 B2   5/2016 Park et al.
2002/0154605 A1  10/2002 Preston et al.
(Continued)

FOREIGN PATENT DOCUMENTS

CN   103858405 A   6/2014
CN   105208077 A   12/2015
(Continued)

OTHER PUBLICATIONS

Office Action for Chinese Patent Application No. 201810554415.1; dated Oct. 23, 2020.

*Primary Examiner* — John A Follansbee
*Assistant Examiner* — Fadi Haj Said
(74) *Attorney, Agent, or Firm* — Barnes & Thornburg LLP

(57) ABSTRACT

A method for data transmission between subscribers in a transportation vehicle communication network of a transportation vehicle, wherein at least one subscriber of the transportation vehicle communication network is a transportation vehicle subscriber arranged in the transportation vehicle, wherein a subscriber of the transportation vehicle communication network forms or provides a notification manager of the transportation vehicle communication network, wherein a notifying subscriber of the transportation vehicle communication network transmits notification data to the notification manager, wherein the notification manager transmits at least one part of the notification data to at least one subscriber to be notified in the transportation vehicle communication network.

11 Claims, 1 Drawing Sheet

(51) Int. Cl.
   *H04L 67/5651*    (2022.01)
   *H04L 67/55*      (2022.01)
   *H04L 67/63*      (2022.01)

(56) References Cited

U.S. PATENT DOCUMENTS

| | | | |
|---|---|---|---|
| 2012/0072482 | A1 | 3/2012 | Causse et al. |
| 2014/0019522 | A1* | 1/2014 | Weng .................... G06F 16/903 709/203 |
| 2014/0310788 | A1* | 10/2014 | Ricci .................... G06V 40/168 726/6 |
| 2015/0288636 | A1* | 10/2015 | Yalavarty ................ H04L 51/16 709/206 |
| 2016/0050265 | A1* | 2/2016 | Botticelli .............. H04L 67/125 709/219 |
| 2017/0124871 | A1* | 5/2017 | Sunadham ............... H04Q 9/00 |
| 2017/0294059 | A1* | 10/2017 | Noyelle ................ H04W 76/10 |
| 2018/0091608 | A1* | 3/2018 | Camacho ................ H04L 67/22 |
| 2018/0352040 | A1* | 12/2018 | Bartsch ................... H04L 67/26 |

FOREIGN PATENT DOCUMENTS

| | | | | |
|---|---|---|---|---|
| DE | 102014201948 | A1 | 8/2015 | |
| DE | 102014201948 | A1 * | 8/2015 | ............. H04L 67/42 |
| DE | 102014201954 | A1 | 8/2015 | |
| DE | 102014201954 | A1 * | 8/2015 | ......... G06F 9/45558 |
| DE | 102015103974 | A1 | 10/2015 | |
| DE | 102015103974 | A1 * | 10/2015 | ............. H04L 51/16 |
| DE | 102015200947 | B3 | 7/2016 | |
| DE | 102016221985 | A1 | 9/2018 | |
| WO | 2018099683 | A1 | 6/2018 | |

* cited by examiner

METHOD FOR DATA TRANSMISSION IN A TRANSPORTATION VEHICLE COMMUNICATION NETWORK, TRANSPORTATION VEHICLE COMMUNICATION NETWORK, SUBSCRIBER AND TRANSPORTATION VEHICLE

PRIORITY CLAIM

This patent application claims priority to German Patent Application No. 10 2017 209 327.7, filed 1 Jun. 2017, the disclosure of which is incorporated herein by reference in its entirety.

SUMMARY

Illustrative embodiments relate to a method for data transmission in a transportation vehicle communication network, and to a transportation vehicle communication network, and also to a subscriber of the transportation vehicle communication network, and to a transportation vehicle.

BRIEF DESCRIPTION OF THE DRAWINGS

Disclosed embodiments are explained in greater detail on the basis of the figures, in which.

DETAILED DESCRIPTION

Figure 1:
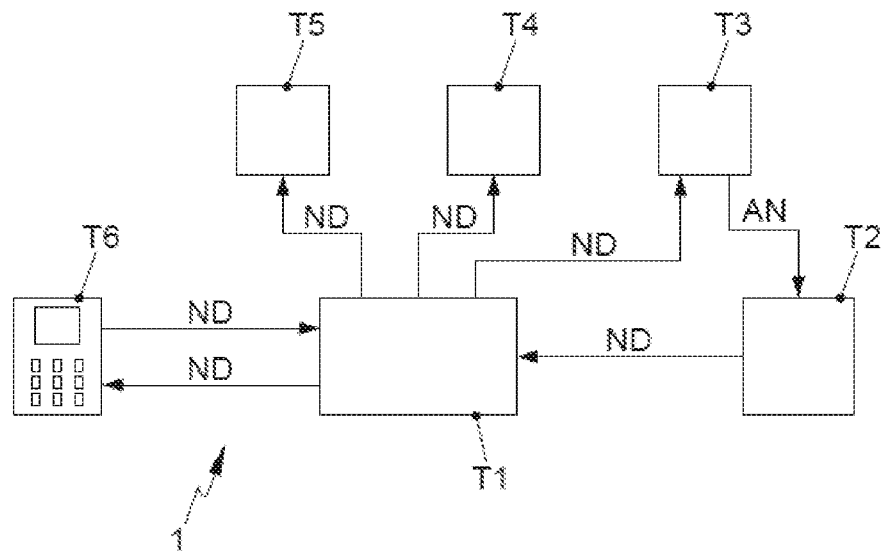
FIG. 1 shows a schematic block diagram of a transportation vehicle communication network.

With progress in electronics, control engineering and communications technology, many types of vehicles, in particular, transportation vehicles, comprise, alongside purely mechanical or electromechanical equipment, systems which mostly comprise a multiplicity of control devices including multimedia and infotainment devices. These devices generally communicate among one another. For the implementation of such communication connections, in particular, various bus systems and onboard electrical systems are known, such as, for example, those in accordance with the CAN—Controller Area Network—standard (ISO 11898), the Flexray standard (ISO 17458-1 to 17458-5), the LIN—Local Interconnect Network—de facto standard, or the MOST—Media Oriented Systems Transport—de facto standard for multimedia and infotainment networks in the automotive industry.

Moreover, further communication network techniques are also known from the field of computer technology and network technology, in particular, Ethernet and the IP—Internet protocol—communication by data packets (IP packets), which forms the basis underlying the Internet. In this case, Internet technology is primarily specified in so-called RFC standards, which also include the standards RFC 2663, RFC2766 (NAT—Network Address Translation) and RFC 3022 (PAT—Port Address Translation), which specify an automated conversion of address and port information, respectively, into data packets for connecting different networks. These standards and protocol definitions mentioned arose from the needs of highly complex and dynamic computer and communication networks such as are often required in the ITC—Information and telecommunications industry.

In the meantime the use of Ethernet-based communications technology has made inroads in transportation vehicles, too. One example of this is the communication protocol "SOME/IP" including "SOME/IP Service Discovery", which was developed by a consortium of transportation vehicle manufacturers and was also included in the AUTOSAR standard (in particular, release 4.1) and specifies a solution for packet-over-Ethernet-based onboard network communication in a transportation vehicle. In this case, by Ethernet communication (layer 2 in the OSI/ISO layer model), TCP/IP packets (layers 3 and 4 in the OSI/ISO layer model) are communicated in the sense of IP-over-Ethernet communication.

Furthermore, it is known, in the development of new or successor transportation vehicle models, to have recourse as much as possible to systems and solutions already available in the predecessor model, to avoid unnecessary new development. Such reuse of predecessor systems may fail, however, if the new transportation vehicle requires additional options or communication connections for which the predecessor system is not designed and to which the latter cannot simply be extended in the sense of scaling.

DE 10 2015 200 947 B3 relates to a packet switching device for a packet-over-Ethernet-based communication network in a vehicle, in particular, a transportation vehicle.

DE 10 2014 201 954 A1 relates to a method for data transmission between at least two subscribers, wherein at least one of the subscribers is configured as a transportation vehicle-side subscriber, wherein the at least one transportation vehicle-side subscriber provides at least one virtual machine or is configured as a virtual machine, wherein at least one further subscriber transmits persistent data to the at least one virtual machine, and also relates to a communication network and a transportation vehicle.

DE 10 2014 201 948 A1 relates to a method for data transmission between at least two subscribers in a transportation vehicle, wherein a first subscriber forms a server in a client-server communication network, wherein at least one further subscriber forms a client in the client-server communication network, wherein a stateless communication between the first subscriber and the at least one further subscriber is effected by the data transmission, and relates to a communication network and a transportation vehicle.

DE 10 2016 221 985, published subsequently, discloses a method for data transmission between at least two subscribers in a transportation vehicle communication network of a transportation vehicle, wherein at least one subscriber of the transportation vehicle communication network is a transportation vehicle subscriber arranged in the transportation vehicle.

In general, a transportation vehicle communication network also comprises subscribers that carry out or control an output of information, in particular, information provided by other subscribers of the transportation vehicle communication network, to a user. What is problematic in the case of a transportation vehicle communication network comprising such subscribers is a temporally rapid, resource-efficient and at the same time reliable output of the information.

Therefore, the technical problem addressed is that of providing a method for data transmission in a transportation vehicle communication network, a communication network and also a subscriber of such a communication network and a transportation vehicle which enable a temporally rapid, resource-efficient and at the same time reliable output of information to users of the transportation vehicle.

A method for data transmission between at least two subscribers in a transportation vehicle communication network of a transportation vehicle is proposed. A transportation vehicle within the meaning of this disclosure can be a land transportation vehicle, a watercraft, an aircraft or any other transportation vehicle for transporting persons and/or material. Optionally, a vehicle is a transportation vehicle, in particular, an automobile.

A subscriber can be a control device of the transportation vehicle. Alternatively, however, a subscriber can also be a transportation vehicle-external device, e.g., a mobile terminal such as a mobile radio telephone, a tablet PC or the like, or a transportation vehicle-external computing device, e.g., a transportation vehicle-external server device.

At least one subscriber of the transportation vehicle communication network is a transportation vehicle subscriber. In this case, a transportation vehicle subscriber denotes a subscriber arranged in the transportation vehicle. The transportation vehicle subscriber can be fixedly installed in the transportation vehicle. The transportation vehicle subscriber can be a control device of the transportation vehicle.

The transportation vehicle communication network can, of course, comprise more than two subscribers, wherein the further subscribers can be transportation vehicle subscribers or transportation vehicle-external subscribers.

Subscribers of the transportation vehicle communication network can form a server or a client in the transportation vehicle communication network. However, the subscribers are not permanently tied to the function of a server or client. In this regard, it is possible for a subscriber to provide a server for one or more data transmission processes and a client for one or more transmission processes that are different therefrom.

In this case, a server can denote a subscriber that provides or offers one or more services. By way of example, a server can offer a service that provides information about a speed of the transportation vehicle via the transportation vehicle communication network. Moreover, information about an engine temperature can also be provided as a service via the transportation vehicle communication network. Moreover, a change in the volume of reproduction of audio information can be provided as a service via the transportation vehicle communication network. Moreover, pausing or stopping the output of audio information currently being reproduced can be provided as a service. The services explained are purely by way of example here. It goes without saying that a multiplicity of further services can also be provided by servers via the transportation vehicle communication network. Such services are known, of course, to the person skilled in the art.

A service can be a defined function that a server offers and a client can use. A service can be used in a location-independent manner. Optionally, a service is offered in such a way that a client using the service does not require information about the implementation of the service for using/performing the latter. This leads to the reduction or complete cancellation of dependencies between the use of services and the implementation thereof. Interfaces of a service can be configured as upward and downward compatible. When a service is used, it is possible to employ established standards for communication with the aim of good maintainability and reusability. Furthermore, a service can be designated as an operation or at least one operation can be carried out when a service is performed.

A client can denote a subscriber that uses an offered or provided service.

The transportation vehicle communication network can be an Ethernet-based communication network. In such a communication network, data can be transmitted by data packets being transmitted between subscribers via the communication network. The subscribers can have corresponding Ethernet interfaces. In this case, the data transmission can be effected in accordance with known transmission protocols.

In this case, a subscriber can comprise a control and evaluation device for controlling the data transmission and for evaluating responses or the information contained therein. Such a control and evaluation device can be provided, for example, by a microcontroller.

Data, in particular, data packets, to be transmitted can contain a destination addressing, which can be provided by an addressing of a single destination. Furthermore, data, in particular, data packets, to be transmitted can contain a source addressing. The addressing of destinations and sources in the network can be effected here in each case by a corresponding Ethernet address/network address/port combination for the destination node and source node, respectively. In the OSI/ISO layer model, in general the Ethernet address (i.e., "Ethernet Media Access Control" (MAC) address) can be assigned to layer 2, the network address (e.g., IP address) can be assigned to layer 3, and the port (e.g., TCP port or UDP port) can be assigned to layer 4. An "Ethernet address/network address/port combination" within the meaning of the disclosure can be understood as a combination of an Ethernet address/network address (e.g., IP address) with an assigned port. A destination Ethernet address/network address/port combination thus contains, specified in the data, the destination Ethernet address, destination network address and also the assigned destination port. Analogously, a source Ethernet address/network address/port combination contains, specified in the data, the source Ethernet address, source network address and also the assigned source port. On the basis of such Ethernet address/network address/port combinations, switching of the data can be effected in the transportation vehicle communication network.

A "port" within the meaning of the disclosure should be understood as an addition to a network address that brings about the assignment of connections and data to server and client programs at the transmitter subscriber and at the receiver subscriber, respectively. In this regard, it is thus possible, for instance, for data concerning different services provided by a server to be made available to a receiver (client) and to be separately assigned there to the corresponding service-related applications, even though the data of both services were communicated from an identical network address (e.g., IP address) of the transmitter to a single network address of the receiver. Services can thus be provided via different ports to the same Ethernet address/network address, e.g., MAC/IP address.

An "Ethernet interface" within the meaning of the disclosure should be understood as a device of a technical entity by which an Ethernet communication connection to at least one other technical entity can be provided. Such a technical entity can be, for instance, a network node in an Ethernet communication network. An Ethernet interface can physically comprise a connection device for connection to a line for the Ethernet transmission, in particular, to a standardized Ethernet line. Furthermore, the communication interface can comprise a method for data processing or conditioning, by which data or other information can be communicated in a predetermined manner at the transmitter end and respectively processed in accordance with the standardized requirements of Ethernet communication at the receiving end.

A "vehicle" within the meaning of the disclosure should be understood as any type of transportation vehicle by which one or more persons and/or cargo can be transported. A car, a truck, a motorcycle, a bus, a bicycle or a trailer attached to one of the transportation vehicles mentioned above is a transportation vehicle within the meaning of the disclosure. This also applies to the traction unit and the trailers of a train and to a watercraft or an aircraft, in particular, an airplane.

"Configured" within the meaning of the disclosure should be understood such that the corresponding device has already been set up to fulfil a specific function. "Configurable" should be understood as an extension thereof such that the corresponding device is settable such that upon corresponding setting the device is set up to fulfil the specific function. In this case, the configuration can be effected, for example, via a corresponding setting of parameters of a process sequence or of switches or the like for activating or deactivating functionalities or settings.

A subscriber of the transportation vehicle communication network forms a notification manager of the transportation vehicle communication network or provides a notification manager. A notification manager can also be designated as a notification server. For providing or forming the notification manager, the transportation vehicle subscriber can thus perform the functions of a server.

Optionally, the transportation vehicle subscriber forms the notification manager of the transportation vehicle communication network or provides the notification manager.

In this case, a notification manager serves for reception and for further transmission, in particular, for distribution, of notification data. In this case, notification data comprise data that code information outputtable to a user of the transportation vehicle communication network. Besides data of this type, however, notification data can also code information that need not or cannot or need not necessarily or cannot necessarily be output to a user.

A user of the transportation vehicle communication network can be a transportation vehicle occupant, e.g., a transportation vehicle driver but also a transportation vehicle occupant different from the transportation vehicle driver. However, it is also possible for a user of the transportation vehicle communication network to be a user not arranged in the transportation vehicle.

"Outputtable" within the meaning of this disclosure should be understood such that the information can be communicated to the user, for example, by at least one suitable output device. In this case, the information can be output, e.g., visually, i.e., optically, acoustically, haptically or in some other suitable form. By way of example, the content can be displayed on a display device of the transportation vehicle, for example, a head-up display, a head unit, a combined instrument, a center display or a display device of an infotainment system. However, it is also possible for the content to be displayed on a display device of a subscriber not fixedly installed in the transportation vehicle, e.g., on a mobile radio telephone. Moreover, the content can be output acoustically, e.g., by at least one loudspeaker.

In this case, a notifying subscriber of the transportation vehicle communication network transmits the notification data to the notification manager. Furthermore, notification data can code further information. Furthermore, the notification manager transmits at least one part of the notification data, optionally the entire notification data, transmitted by the notifying subscriber to at least one, but optionally to a plurality of, subscriber(s) to be notified in the transportation vehicle communication network.

In this case, the notifying subscriber of the transportation vehicle communication network can generate the notification data. The latter can be stored after transmission to the notification manager in a manner retrievable by the latter, in particular, for a predetermined time duration. After the predetermined time duration has elapsed, the notification data can be erased by the notification manager. Moreover, the notification data can be erased by the notification manager if the notification manager detects handling processing of the notification data, e.g., by a subscriber. Handling processing can be detected, for example, if a corresponding property, in particular, the property "selectedAction" also explained below, of a notification object stored by the notification manager has already been set. This property can be set, e.g., by the subscriber carrying out the handling processing.

It is possible for the notification manager to transmit the notification data to a subscriber to be notified only if the subscriber to be notified has registered itself as a receiver of notification data at the notification manager. In this case, the registration can thus be effected before the transmission of notification data. In this case, the notification manager can assign a unique identification in each case to the subscribers to be notified. Moreover, the notification manager can assign a unique identification to the one notifying subscriber.

The registration can be effected when the subscriber to be notified and/or the notifying subscriber log(s) on in the transportation vehicle communication network and/or when the transportation vehicle communication network is set up. As a result of the registration, a subscriber-specific address can be allocated to the subscriber to be notified and/or to the notifying subscriber, e.g., by the notification manager. This address can then be used for the transmission of data, in particular, notification data.

In the case of the registration of a notifying subscriber, by way of example, it is possible to generate an issuer object, which will be explained in even greater detail below.

In this case, the transmission of notification data from the notification manager to the subscriber to be notified can be effected directly, in particular, as soon as the transmission is possible. In this case, in particular, no separate interrogation or enabling of the transmission of the notification data is necessary. However, it is also conceivable for the transmission of the notification data received and possibly stored by the notification manager to be effected only if this transmission is interrogated or enabled by the subscriber to be notified. In this regard, it is conceivable, for example, for the subscriber to be notified to interrogate repeatedly the presence of notification data, in particular, of notification data that have not yet been transmitted to the subscriber, at the notification manager and/or for the notification manager to transmit information about the presence of notification data, in particular, of notification data that have not yet been transmitted, to the subscriber to be notified, wherein the latter then decides whether and when the notification data ought to be interrogated from the notification manager.

In summary, therefore, the notification manager serves for collecting and providing notification data for subscribers of the transportation vehicle communication network which can at least partly carry out or control the output of the information coded by the notification data to a user. Consequently, a subscriber to be notified is a subscriber which can at least partly carry out or control an output of the outputtable information coded by the notification data to a user.

The coded information can then be output in a subscriber-specific manner. The type of output, e.g., an acoustic, optical or haptic output, can be defined by the subscriber. Moreover, it is possible to define whether the entire information coded by the notification data or only an, in particular, subscriber-specific, part of the information is output.

In this case, however, the notification manager can transmit the same notification data, in particular, notification data having the same content, to each subscriber to be notified. In other words, no filtering, processing or adaptation of the notification data is effected by the notification manager.

This results in a temporally rapid and reliable transmission of notification data in the transportation vehicle communication network in a manner taking up few resources, which transmission in turn ensures the reliable and suitable output of the outputtable information coded in the notification data to users of the transportation vehicle communication network.

In a further disclosed embodiment, the subscriber to be notified carries out an output of at least one part of the information coded in the notification data to a user. Consequently, the subscriber to be notified is a so-called output-enabled subscriber. The output can be effected as a reproduction, for example, a graphical or acoustic reproduction.

Mutually different subscribers to be notified can thus output the same outputtable contents of the notification data transmitted to the subscribers in different forms. Alternatively or cumulatively, the different subscribers can also output different parts of the outputtable contents, e.g., an image content or a text content or an audio content.

It is possible for the same notification data to be transmitted to all the subscribers to be notified. However, it is also possible for different parts of the notification data to be transmitted to specific and mutually different subscribers to be notified. In this regard, by way of example, only a subscriber-specific part of the notification data rather than all the notification data can be transmitted to a subscriber to be notified. Consequently, different parts of the notification data can be transmitted to different subscribers. A corresponding filtering is explained in even greater detail below.

This results in a reliable output of information to a user of the transportation vehicle communication network, the output being adapted to different subscribers.

In a further disclosed embodiment, the notification data code information about at least one service address, wherein a service provided by a subscriber is able to be called up under the coded service address. The subscriber can be the notifying subscriber. However, it is also possible for the service address to be an address of a subscriber that is different from the subscriber to be notified. A service address can be specified as a URI. In this case, the service address can be a property of an action object. This is explained in even greater detail below.

By way of example, the notifying subscriber can provide services in the transportation vehicle communication network, for example, a pause service, a play service and a stop service for the reproduction of audio contents. The service address can then be, e.g., an address to which a signal for pausing, playing or stopping the audio reproduction can be transmitted, in particular, as a request. This results in a temporally rapid and efficient control of the performance of services in the transportation vehicle communication network.

In a further disclosed embodiment, the notification data code information about at least one notification reaction. This information, too, can be output. A notification reaction can be an action which is able to be carried out by at least one subscriber of the transportation vehicle communication network, particularly if a corresponding user input or user activity is carried out. In this case, the action can be carried out as a reaction to an output content of the notification data. Consequently, the notification reaction can be related to the outputtable content of the notification data. By way of example, an action can lead to the above-explained pausing, playing or stopping of the audio reproduction.

Furthermore, the notification reaction is assigned at least one service provided by a subscriber of the transportation vehicle communication network. The subscriber can be in turn the notifying subscriber or a subscriber different therefrom. The notification reaction can be assigned the above-explained service address that is coded by the notification data. The information about the notification reaction can be coded, e.g., as a property of a notification object, e.g., as an action. The property can, e.g., be coded as an action object or refer to an action object.

If the notification data code information about at least one service address or about at least one notification reaction, then the notification data can also be designated as interactive notification data.

In this case, an output of information about the notification reaction can also be carried out or controlled by the subscriber to be notified. By way of example, a pause symbol, a play symbol or a stop symbol can be output, in particular, represented, to a user. These symbols can be assigned to an actuation element, for example, a key or a predetermined region of a touchscreen. Consequently, the fact that the notification reaction represented by the symbol is able to be carried out by actuating the corresponding actuation element can be conveyed to the user and grasped by the latter.

In a further disclosed embodiment, a user reaction is detected and at least one reaction-specific service provided by a subscriber, in particular, by the notifying subscriber or a subscriber different therefrom, is called up if the user reaction was detected. The user reaction can be detected, for example, if the user actuates an actuation element assigned to the reaction. This has already been explained above. Moreover, the user reaction can be detected if a voice command of the user that is assigned to the reaction is detected. In this case, the service provided under the service address coded in the notification data can be called up by the notified subscriber.

This results in reliable and temporally rapid information and performance of services provided in the transportation vehicle communication network.

In a further disclosed embodiment, the notification data code no information about a notification reaction. In this case, the notification data can also be designated as passive notification data. The notification data in this case can code no information either about a service address under which a service provided by a subscriber is able to be called up. In other words, passive notification data can only code such information which is to be output to a user without a reaction of the user being required. The information can also be designated as purely informative information. Notification data of this type can code, for example, the content of a text message which is intended to be received by a mobile radio device and displayed on a display device of the transportation vehicle.

This results in a reduced volume of data to be transmitted for cases in which no reaction to notification data is required.

In at least one disclosed embodiment, the notification data are transmitted as a data object. A data object for transmitting notification data can also be designated as a notification object. In this case, the notification manager can manage the notification object.

A notification object can have one, a plurality or all of the properties listed in Table 1. It goes without saying, however, that a notification object can also have even further and/or alternative properties.

TABLE 1

| Name | Description | Type | Format |
| --- | --- | --- | --- |
| Actions | Data field with references to possible actions | Data field | |
| Badge | Image for representing the notification | String | URI |
| Content | Plain text of the notification content | String | |
| creationTime | Time of creation of the notification object | String | Date-time of day |
| defaultAction | Reference to standard action that is carried out when a standard user reaction is carried out | Object | |
| dismissAction | Reference to action that is carried out when the notification is dismissed | Object | |
| eventTime | Time of the event that triggered the creation of the notification | String | Date-time of day |
| Icon | Image for representing the notification content | String | URI |
| Id | Identification | String | UUID |
| isUrgent | Priority value representing the need for confirmation by a notified subscriber | Boolean | |
| Issuer | Information about the subscriber that created the notification object | Object | |
| listContent | Content formatted as list | Array | |
| Name | Title of the notification object | String | |
| Priority | Information about priority level, can assume the values "lowest, low, neutral, high, highest" | String | |
| Progress | Information about progress status, can assume values of [−inf . . . 100] | integer | |
| RequireInteraction | Value representing the need for availability through to activation or dismissal of the notification by a user | Boolean | |
| selectedAction | Reference to an action to be carried out, can be set by a subscriber | Object | |
| State | Status of the carrying out or operation, can assume the values "failed, running, waiting, pausing, ended" | string | |
| URI | Object URI (Object Uniform Resource Identifier) | String | URI |
| VoicePrompt | Supplementary prompt for voice output | String | |

Notification objects can be accessed, for example, by a Get operation. Notification objects can be created, e.g., by a Post operation. In this case, notification objects can be accessed and created at a so-called resource level. In this case, access and creation can be made possible by the notification manager. However, other subscribers of the transportation vehicle communication network can also access and/or create notification objects. For creating notification objects, the specification of one, a plurality or all of the properties mentioned hereafter may be mandatory: badge, content, creationTime, defaultAction, dismissAction, eventTime, icon, isUrgent, issuer, listConent, name, priority, progress, requireInteraction, selectedAction, state, voicePrompt.

Properties of notification objects can be accessed, for example, by a Get operation. Properties of notification objects can be changed or created, e.g., by a Post operation. Properties of notification objects can be erased, e.g., by a Delete operation. For this purpose, the notification objects can be addressed via their UUID (universally unique identifier).

In this case, accessing, creating/changing and/or erasing properties of notification objects can be effected at a so-called element level. In this case, accessing, creating/changing and/or erasing can be made possible by the notification manager. However, other subscribers of the transportation vehicle communication network can also access and/or create or change or erase properties of notification objects.

For creating or changing properties of notification objects, the specification of one or both of the properties mentioned hereafter may be mandatory: progress, state.

For carrying out the proposed method, the subscribers of the transportation vehicle communication network can also transmit data as action objects, as issuer objects or as whitelist objects.

In this case, action objects code information about properties of actions, in particular, about user reactions. In this case, issuer objects code information about subscribers that generate notification data or notification objects. The latter can correspond to the notifying subscribers. In this case, whitelist objects code information about notifying subscribers whose notification data or notification objects are intended to be transmitted to the subscriber to be notified.

In this case, the notification manager can manage the action objects and/or the issuer objects and/or the whitelist objects.

An action object can have one, a plurality or all of the properties listed in Table 2. It goes without saying, however, that an action object can also have even further and/or alternative properties.

TABLE 2

| Name | Property | Type | Format |
| --- | --- | --- | --- |
| callbackBody | Information that is mandatorily part of a reaction request | String | |
| callbackHeader | HTTP header information that is mandatorily | String | |

TABLE 2-continued

| Name | Property | Type | Format |
|---|---|---|---|
| | part of a reaction request | | |
| callbackMethod | HTTP expression for the user reaction, can assume the value "Get, Delete, Post, Put" | String | |
| callbackURI | URI under which the user reaction is interrogated | String | URI |
| icon | Image for representing the action | String | URI |
| Name | Name of the action | String | |
| Id | Identification | String | UUID |
| Object URI (Object Uniform Resource Identifier) | String | URI | |

Action objects can be accessed, for example, by a Get operation. Action objects can be created, e.g., by a Post operation. In this case, accessing and creating action objects can be effected at the resource level. In this case, accessing and creating can be made possible by the notification manager. However, other subscribers of the transportation vehicle communication network can also access and/or create action objects. For creating action objects, the specification of one, a plurality or all of the properties mentioned hereafter may be mandatory: callbackBody, callbackHeader, callbackMethod, callbackURI, icon, name.

Properties of action objects can be accessed, for example, by a Get operation. Properties of action objects can be changed or created, e.g., by a Post operation. Properties of action objects can be erased, e.g., by a Delete operation. For this purpose, the action objects can be addressed via the UUID.

In this case, accessing, creating/changing and/or erasing properties of action objects can be effected at the so-called element level. In this case, accessing, creating/changing and/or erasing can be made possible by the notification manager. However, other subscribers of the transportation vehicle communication network can also access and/or create or change or erase properties of action objects. For creating or changing properties of action objects, the specification of one or both of the properties mentioned hereafter may be mandatory: callbackBody, callbackHeader, callbackMethod, callbackURI, icon, name.

An issuer object can have one, a plurality or all of the properties listed in Table 3. It goes without saying, however, that an Issuer object can also have even further and/or alternative properties.

TABLE 3

| Name | Property | Type | Format |
|---|---|---|---|
| Active | Information about state regarding the notification data generation, can assume values "on" or "off" | Boolean | |
| Name | Name of the action | String | |
| Id | Identification | String | UUID |
| Object URI (Object Uniform Resource Identifier) | String | URI | |

Issuer objects can be accessed, for example, by a Get operation. Issuer objects can be created, e.g., by a Post operation. In this case, accessing and creating action objects can be effected at the resource level. In this case, accessing and creating can be made possible by the notification manager. However, other subscribers of the transportation vehicle communication network can also access and/or create issuer objects.

Properties of issuer objects can be accessed, for example, by a Get operation. Properties of issuer objects can be changed or created, e.g., by a Post operation. For this purpose, the issuer objects can be addressed via the UUID.

In this case, accessing and/or creating/changing properties of action objects can be effected at the so-called element level. In this case, accessing and/or creating/changing can be made possible by the notification manager. However, other subscribers of the transportation vehicle communication network can also access and/or create or change properties of action objects. For creating or changing properties of issuer objects, the specification of the property active may be mandatory.

A whitelist object can have one, a plurality or all of the properties listed in Table 4. It goes without saying, however, that a whitelist object can also have even further and/or alternative properties.

TABLE 4

| Name | Property | Type | Format |
|---|---|---|---|
| allowedIssuers | Information about subscribers whose notification data are accepted | Data field | |
| Name | Name of the action | String | |
| Id | Identification | String | UUID |
| Object URI (Object Uniform Resource Identifier) | String | URI | |

Whitelist objects can be accessed, for example, by a Get operation. Whitelist objects can be created, e.g., by a Post operation. In this case, accessing and creating whitelist objects can be effected at the resource level. In this case, accessing and creating can be made possible by the notification manager. However, other subscribers of the transportation vehicle communication network can also access and/or create whitelist objects. For creating whitelist objects, the specification of one, a plurality or all of the properties mentioned hereinafter may be mandatory: allowedIssuer, name.

Properties of whitelist objects can be accessed, for example, by a Get operation. Properties of whitelist objects can be changed or created, e.g., by a Post operation. Properties of whitelist objects can be erased, e.g., by a Delete operation. For this purpose, the whitelist objects can be addressed via the UUID.

In this case, accessing, creating/changing and/or erasing properties of whitelist objects can be effected at the so-called element level. In this case, accessing, creating/changing and/or erasing can be made possible by the notification manager. However, other subscribers of the transportation vehicle communication network can also access and/or create or change or erase properties of whitelist objects. For creating or changing properties of whitelist objects, the specification of one or both of the properties mentioned hereafter may be mandatory: allowedIssuers, name.

In this case, notification objects, action objects, issuer objects and/or whitelist objects can be created by subscribers of the transportation vehicle communication network. Furthermore, they can be transmitted to other subscribers, in particular, to the notification manager. The latter can store the objects and, if desired, transmit them to further subscribers. In this case, other subscribers can also access objects stored by the notification manager or the properties of the objects.

In a further disclosed embodiment, the notification manager transmits the notification data only to selected subscribers to be notified. In this case, therefore the notification manager can transmit the notification data transmitted by the notifying subscriber not to all, in particular, only to one or a plurality, but not all, of the subscribers to be notified, which are registered, for example, at the notification manager for the transmission of notification data.

Alternatively or cumulatively, the notification manager transmits only a subscriber-specific part of the entire notification data to a subscriber to be notified. In this case, therefore, the notification manager can transmit only a subscriber-specific part of the notification data transmitted by the notifying subscriber, rather than all of the notification data, to a subscriber to be notified. In this case, the subscriber to be notified can be registered, for example, at the notification manager for the transmission of only the subscriber-specific part of the notification data.

The selection of the subscribers to be notified and/or of the subscriber-specific part is effected by filtering. What is important is that, rather than the coded content of the notification data, only the receiver thereof or the part of the parts to be transmitted is selected by the filtering.

In this case, various filter criteria may exist which are evaluated for determining the selected subscribers or the subscriber-specific part to be transmitted. In this regard, the selection can be made, for example, depending on a time of day, depending on an identity of a transportation vehicle occupant, for example, of a transportation vehicle driver, depending on current traveling-dynamic variables, for example, a speed, or further criteria. In this regard, by way of example, a specific transportation vehicle driver can stipulate that contents of notification data are intended to be output only by display devices, but not by audio reproduction devices. In this case, therefore, the notification data can be transmitted only to subscribers that can carry out or control a visual reproduction. Alternatively or cumulatively, only a part of the notification data that codes only visually outputtable information can be transmitted to a subscriber that can carry out or control an audiovisual reproduction.

Optionally, a filtering can be effected depending on a whitelist object, wherein the whitelist object was created by a subscriber. In this case, the whitelist object can be transmitted from the subscriber to the notification manager and be stored by the notification manager. The subscribers to be notified can then be selected depending on information coded in whitelist objects generated thereby. By way of example, a subscriber to be notified can be selected only if notification data originate from a subscriber that is coded under the property "allowedIssuers" in the whitelist object generated by the selected subscriber. Furthermore by way of example only a part of the notification data that is coded under a further property in the whitelist object generated by a subscriber to be notified can be transmitted to the subscriber.

In at least one disclosed embodiment, the subscribers to be notified and/or the subscriber-specific part of the notification data are/is selected depending on a format and/or a content of the notification data. If it is detected, for example, by the notification manager, that the information coded by the notification data is pure audio information, then the notification manager can transmit the notification data only to such subscribers to be notified that are suitable for outputting audio information. If the notification data code, e.g., visually and acoustically outputtable information, then the notification manager can transmit only the part of the notification data that codes the visually outputtable information to a subscriber to be notified that has registered itself for the transmission of only visually outputtable information.

This results in a more efficient utilization of the transportation vehicle communication network since data have to be transmitted in a targeted manner and thus to a lesser extent.

In a further disclosed embodiment, the subscriber to be notified transmits at least one filter criterion to the notification manager. The filter criterion is evaluated for filtering and thus for selection of the subscribers to be notified. By way of example, the information that the subscriber is suitable only for reproducing audio information can be transmitted as a filter criterion. In that case the subscriber is not selected if the notification data code no audio data. This likewise results in efficient operation of the transportation vehicle communication network.

By way of example, the subscriber to be notified can transmit a whitelist object that codes information about the subscribers whose notification data are intended to be transmitted to the subscriber to be notified. Moreover, information about a part of the notification data that are intended to be transmitted to the subscriber to be notified can be coded in the whitelist object.

In a further disclosed embodiment, a stateless communication is effected by the data transmission between subscribers of the transportation vehicle communication network.

Such a stateless communication is described in DE 10 2014 201 948 A1, which was explained in the introduction and the full scope of the disclosure of which is hereby incorporated by reference.

Stateless can mean, in particular, that data of a complete client-side request and/or data of a complete server-side response are transmitted in each case in exactly one transmission process. In this case, the server-side response can be a response to the client-side request, wherein such a response can be designated as a corresponding response. Inter alia, stateless can also mean that all information necessary for performing at least one server-side operation is transmitted in exactly one transmission process from the client to the server. Furthermore, stateless can mean that all information required for performing at least one client-side operation is transmitted in exactly one transmission process from the server to the client. Furthermore, stateless can also mean that all information required for confirming an operation requested by a server is transmitted in exactly one transmission process from the client to the server. Furthermore, stateless can also mean that all information required for confirming an operation requested by a client is transmitted in exactly one transmission process from the server to the client. As a result it is no longer necessary to transmit a client-side request and also a server-side response in a sequence comprising a plurality of transmission processes, as has been customary hitherto. In this case, an individual transmission process denotes a part of an overall sequence required for a synchronization of the states in client and server.

In this case, requests, in particular, client-side requests, can be, e.g., a read request, a write request or an erase request, which respectively trigger at the server or at the client a read operation, a write operation or an erase operation. In this case, a write request can be a generation request or an update request. At least one request and/or response in the above-explained registration process, an address memory request, a service category request, a service performance request, a service request and corresponding responses can also be requests and responses of a stateless data transmission.

In other words, stateless can also mean that a subscriber needs no information about the state of a further subscriber to carry out with the latter a data transmission for a desired purpose, e.g., for using a service. Moreover, stateless can mean that the subscribers can perform operations on the basis of the information transmitted in the one transmission process and require no further knowledge, in particular, no further knowledge about previously implemented communication processes and/or the information communicated therein.

As an alternative to the retrievable storage of service categories and service addresses assigned thereto by/in the registration server, the determination of services which can be provided by servers via the transportation vehicle communication network can also be effected by a so-called multicast method. In this case, a subscriber can transmit, e.g., periodically, information about the services that it provides, in particular, information about the functionality of the services and/or concerning the corresponding service category, and also the assigned service address, to all subscribers of the transportation vehicle communication network. In this case, subscribers can store the corresponding information and subsequently use it for determining and performing services. This can be effected via the SOME/IP standard, for example.

A transportation vehicle communication network is furthermore proposed, wherein the transportation vehicle communication networks comprises subscribers, wherein at least one subscriber of the transportation vehicle communication network is a transportation vehicle subscriber arranged in the transportation vehicle. In this case, the subscribers can be data-technologically connected via the transportation vehicle communication network. In this case, a data-technological connection can be a wired connection or else a wireless connection.

A subscriber of the transportation vehicle communication network forms or provides a notification manager of the transportation vehicle communication network. The transportation vehicle subscriber may form or provide the notification manager. Furthermore, notification data are transmittable to the notification manager by a notifying subscriber of the transportation vehicle communication network, wherein at least one part of the notification data are transmittable to at least one subscriber to be notified in the transportation vehicle communication network by the notification manager.

A method in accordance with at least one of the embodiments described in this disclosure is able to be carried out by the transportation vehicle communication network. Consequently, the transportation vehicle communication network can be designed or configured in such a way that such a method is able to be carried out by the transportation vehicle communication network.

Besides at least one transportation vehicle subscriber, the transportation vehicle communication network can also comprise further transportation vehicle subscribers and/or further transportation vehicle-external subscribers, in particular, mobile terminals or transportation vehicle-external server devices. Furthermore, the transportation vehicle communication network can comprise data switching devices or subscribers.

A subscriber of a transportation vehicle communication network in accordance with at least one of the embodiments explained in this disclosure is furthermore proposed. In this case, the subscriber forms or provides a notification manager of the transportation vehicle communication network. The subscriber can be a transportation vehicle subscriber.

A transportation vehicle is furthermore proposed, wherein the transportation vehicle comprises at least one transportation vehicle subscriber of a transportation vehicle communication network, wherein a subscriber of the transportation vehicle communication network, in particular, the transportation vehicle subscriber, forms or provides a notification manager of the transportation vehicle communication network.

Hereinafter, identical reference signs designate elements having identical or similar technical features.

FIG. 1 shows a schematic block diagram of a transportation vehicle communication network 1, wherein the transportation vehicle communication network 1 comprises six subscribers T1, T2, T3, T4, T5, T6. In this case, a first subscriber T1 is a transportation vehicle subscriber and is designed as a notification manager. A second subscriber T2 is likewise a transportation vehicle subscriber and forms for example, a control device for an acoustic reproduction of audio information. A third subscriber T3 is likewise a transportation vehicle subscriber and forms, e.g., a control device for a display input device of the transportation vehicle 2 (see FIG. 2), for example, a so-called touchscreen.

A fourth subscriber T4 is likewise a transportation vehicle subscriber and forms, for example, a control device of a display device, for example, of a head-up display in the transportation vehicle 2.

A fifth subscriber T5 is likewise a transportation vehicle subscriber and can form, for example, a control device for a loudspeaker in the transportation vehicle.

A sixth subscriber T6 is a transportation vehicle-external subscriber and is designed, for example, as a mobile radio device.

The subscribers T1, T2, T3, T4, T5, T6 can provide services via the transportation vehicle communication network 1. Consequently, the subscribers T1, . . . , T6 can be designed as servers. It goes without saying that the subscribers T1, . . . , T6 can also form clients, particularly if they use services (not illustrated) of further servers.

The subscribers T1, . . . , T6 in the transportation vehicle communication network 1 are data-technologically connected, in particular, in a wired manner, e.g., via a bus system, or in a wireless manner.

In the exemplary embodiment illustrated in FIG. 1, the second subscriber T2 and the sixth subscriber T6 form notifying subscribers of the transportation vehicle communication network 1. The third, fourth, fifth subscribers T3, T4, T5 and also the sixth subscriber T6 form subscribers to be notified in the transportation vehicle communication network. Consequently, the notifying subscriber T6 can also be a subscriber T6 to be notified. The subscribers T3, T4, T5, T6 to be notified can be registered as such at the notification manager.

An acoustic output of at least one part of information coded in notification data ND to a user can be carried out or controlled by the fifth subscriber T5. An optical output, for example, as a visually detectable representation, of at least one part of the information coded in the notification data ND to the user can be effected by the third and fourth subscribers T3, T4. Such an optical output can be effected via the sixth subscriber T6, too. By way of example, the third, fourth and sixth subscribers T3, T4, T6 can represent the information on a display device, e.g., a display.

It is, e.g., possible for the sixth subscriber T6 to receive a text message, for example, an SMS, and after reception to transmit notification data ND to the notification manager T1, wherein the notification data ND code the text information of the short message.

After receiving the notification data ND from the sixth subscriber T6, the notification manager 1 can transmit the notification data ND to the third, fourth and fifth subscribers T3, T4, T5.

By way of example, the third and fourth subscribers T3, T4 can then output the text content, e.g., by corresponding symbols on a display device. The fifth subscriber T5 can output the text content acoustically, for example.

In this case, the notification data ND transmitted by the sixth subscriber T6 can be transmitted to all subscribers T3, T4, T5 to be notified that are registered at the notification manager T1, or only to selected subscribers T3, T4 to be notified. If the notification data ND are transmitted only to selected subscribers T3, T4, then the subscribers T3, T4 to be notified can be selected from the set of registered subscribers T3, T4, T5 depending on a filtering. By way of example, the filtering can be effected depending on a content of the notification data ND. In this regard, by way of example, the text message can be transmitted only to the subscribers T3, T4 to be notified that enable a visual or graphical representation of the text. In this case, therefore, the notification data ND are not transmitted from the notification manager T1 to the fifth subscriber T5 since the latter is suitable only for audio output.

In the case of the present example it should be noted that the sixth subscriber T6 also forms a subscriber to be notified that is registered at the notification manager T1. However, if a registered subscriber to be notified forms a notifying subscriber during a data transmission via the notification manager, then it is not mandatory for the notification data ND to be transmitted back again to the notifying subscriber. In this case, therefore, the set of all registered subscribers to be notified may not encompass the notifying subscriber.

The text information transmitted by the sixth subscriber T6 can be transmitted, e.g., as so-called passive notification data ND. In this case, the outputtable part of the information coded by the notification data ND comprises no information about a notification reaction.

In contrast thereto, the notification data transmitted by the second subscriber T2 can also code information about at least one notification reaction. By way of example the second subscriber T2 can transmit to the notification manager notification data ND that code information about a title and/or further properties of an audio content. The notification data ND can then be transmitted by the notification manager in turn to all registered subscribers T3, T4, T5, T6 to be notified or selected subscribers to be notified.

Furthermore, the notification data ND can also code information about possible notification reactions, for example, information about playing, pausing and stopping the output of the audio content. The notification data ND can code information about at least one service address, wherein a service provided by a subscriber, in particular, by the second subscriber T2, is able to be called up under the service address. If the service is called up, then, for example, playing the audio content, stopping the output of the audio content or pausing the output of the audio content can be brought about.

In this case, the third subscriber T3 can visually output the information about the audio content, that is to say the title and/or further properties. Furthermore, the third subscriber T3 can visually output information about the possible notification reactions. This can be carried out, e.g., in such a way that the output information about the notification reaction is assigned to an actuation element, for example, to a key or an input region on the touchscreen which is actuatable by a user.

By actuation of the corresponding actuation field, which actuation can, for example, likewise be detected by the third subscriber T3, the latter can then trigger the corresponding notification reaction, particularly by a corresponding request AN being transmitted to the service address—coded in the notification data—to the second subscriber T2. If an actuation element which is assigned to the output information about the reaction "Pause" is actuated, for example, then a request AN can be transmitted from the third subscriber T3 to the service address of the second subscriber T2, the service address being assigned to a pause service. In this case, the second subscriber T2 can perform a pause service that results in the pausing of the output of the audio content.

The subscribers T1, . . . , T6 in the transportation vehicle communication network can communicate in a stateless manner. In this case, the data transmission between the subscribers T1, . . . , T6 takes place in a stateless communication.

Figure 2:
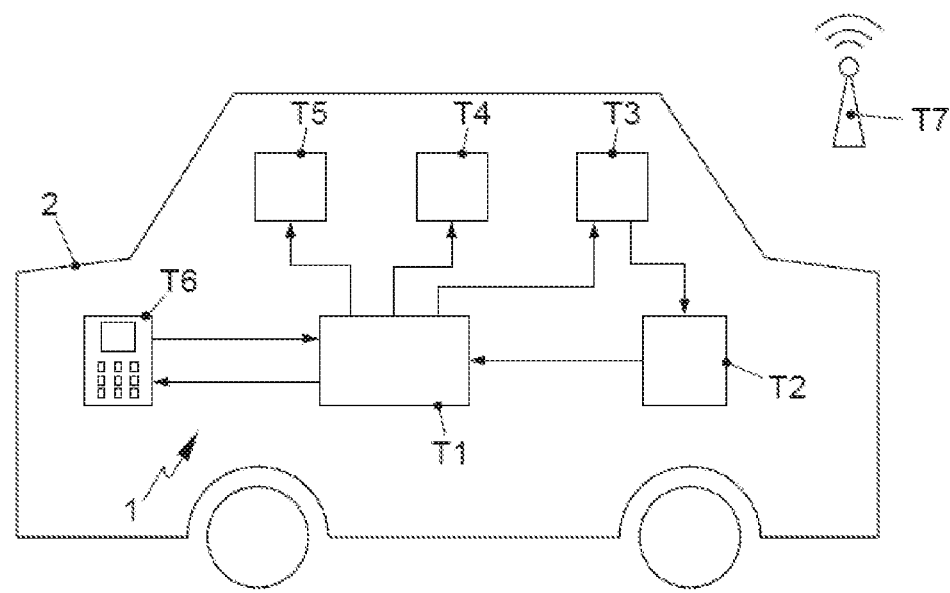
FIG. 2 shows a schematic illustration of a transportation vehicle.

FIG. 2 shows a schematic illustration of a transportation vehicle 2, wherein the transportation vehicle comprises a plurality of transportation vehicle subscribers T1, T2, T3, T4, T5 of a transportation vehicle communication network 1. The transportation vehicle communication network 1 furthermore comprises a sixth subscriber T6. With regard to the design and a method for data transmission in the transportation vehicle communication network 1, reference can be made to the explanations concerning FIG. 1.

A seventh subscriber T7 is furthermore illustrated, which forms a transportation vehicle-external subscriber of the transportation vehicle communication network 1.

In this case, a first subscriber T1 of the transportation vehicle communication network is designed as or provides a notification manager of the transportation vehicle communication network 1.

LIST OF REFERENCE SIGNS

1 Transportation vehicle communication network
2 Transportation vehicle
T1 First subscriber, notification manager
T2 Second subscriber
T3 Third subscriber T4 Fourth subscriber
T5 Fifth subscriber
T6 Sixth subscriber
T7 Seventh subscriber
ND Notification data
AN Request

The invention claimed is:

1. A method for data transmission between a plurality of subscribers in a transportation vehicle communication network of a transportation vehicle,
   wherein at least a first of the plurality of subscribers of the transportation vehicle communication network is a transportation vehicle subscriber arranged in the transportation vehicle,
   wherein a second of the plurality of subscribers of the transportation vehicle communication network forms or provides a notification manager of the transportation vehicle communication network,
   wherein a notifying subscriber of the transportation vehicle communication network generates and transmits notification data to the notification manager as a data object, wherein the notification data comprises data that codes information outputtable to a user of the transportation vehicle communication network and of at least one service address, wherein a service provided by the notifying subscriber which generates the notification data is able to be retrieved under the at least one service address, wherein the service is accessible using the at least one service address and is performed by the notifying subscriber if a request is transmitted to the at least one service address,
   wherein the notification manager transmits at least one part of the notification data to at least one of the plurality of subscribers to be notified in the transportation vehicle communication network,
   wherein the data object is generated by the notifying subscriber, the data object being in the form of a notification object, the notification object comprising at least one data field being an object type data field encoding a reference to an action to be carried out by the at least one of the plurality of subscribers to be notified, wherein the action to be carried out is one of a pause action, a play action, or a stop action for a reproduction of the notification data as audio content, and
   wherein the notification manager creates and changes properties of the notification object.

2. The method of claim 1, wherein the at least one of the plurality of subscribers to be notified outputs at least one part of the information included in the notification data to a user.

3. The method of claim 1, wherein the notification data includes information about at least one notification reaction and wherein the notification reaction is assigned the service provided by the one of the plurality of subscribers of the transportation vehicle communication network.

4. The method of claim 3, wherein the service is a reaction-specific service, and wherein a user reaction is detected and the reaction-specific service is accessed.

5. The method of claim 1, wherein the notification data includes no information about a notification reaction.

6. The method of claim 1, wherein the notification manager transmits the notification data only to a selection of the plurality of subscribers to be notified, wherein the selection of the plurality of subscribers to be notified are selected by filtering, and/or by the notification manager transmitting only a subscriber-specific part of the notification data to the selection of the plurality of subscribers to be notified, wherein the subscriber-specific part to be transmitted is selected by filtering.

7. The method of claim 6, wherein the selection of the plurality of subscribers to be notified and/or the subscriber-specific part of the notification data are/is selected based on a format and/or a content of the notification data.

8. The method of claim 6, wherein at least one of the selection of the plurality of subscribers to be notified transmits at least one filter criterion to the notification manager.

9. The method of claim 1, wherein a stateless communication is effected by the data transmission between the plurality of subscribers of the transportation vehicle communication network.

10. A transportation vehicle communication network,
    wherein the transportation vehicle communication network comprises a plurality of subscribers,
    wherein at least one first of the plurality of subscribers of the transportation vehicle communication network is a transportation vehicle subscriber arranged in the transportation vehicle,
    wherein a second of the plurality of subscribers of the transportation vehicle communication network forms or provides a notification manager of the transportation vehicle communication network,
    wherein notification data is transmittable to the notification manager by a notifying subscriber of the transportation vehicle communication network, wherein the notification data is generated by the notifying subscriber as a data object, wherein the notification data comprises data that codes information outputtable to a user of the transportation vehicle communication network and of at least one service address, wherein a service provided by the notifying subscriber is able to be retrieved under the at least one service address, wherein the service is accessible using the at least one service address and is performed by the notifying subscriber if a request is transmitted to the at least one service address,
    wherein at least one part of the notification data is transmittable to at least one subscriber to be notified in the transportation vehicle communication network by the notification manager;
    wherein the data object is generated by the notifying subscriber, the data object being in the form of a notification object, the notification object comprising at least one data field being an object type data field encoding a reference to an action to be carried out by the at least one of the plurality of subscribers to be notified, wherein the action to be carried out is one of a pause action, a play action, or a stop action for a reproduction of the notification data as audio content, and
    wherein the notification manager creates and changes properties of the notification object.

11. The transportation vehicle communication network of claim 10, further comprising a transportation vehicle, wherein the transportation vehicle comprises at least one transportation vehicle subscriber of the plurality of subscribers and wherein the transportation vehicle subscriber forms or provides the notification manager of the transportation vehicle communication network.

* * * * *